United States Patent [19]
Wheeler et al.

[11] 3,841,235
[45] Oct. 15, 1974

[54] WHEELED VEHICLE TIE-DOWN DEVICE

[75] Inventors: Claud R. Wheeler, Florissant;
Norbert E. Freebourn, Bridgeton,
both of Mo.

[73] Assignee: Broderick & Bascom Rope Company, St. Louis, Mo.

[22] Filed: Apr. 5, 1973

[21] Appl. No.: 348,301

[52] U.S. Cl. ...... 105/368 T, 242/100.1, 248/119 R, 280/179 A
[51] Int. Cl. ............................................. B60p 7/08
[58] Field of Search ................... 105/360 A, 368 T; 280/179 A; 248/361 A, 119 R; 242/100.1, 107.1, 107.13, 107.14, 107.15

[56] References Cited
UNITED STATES PATENTS

| | | | |
|---|---|---|---|
| 421,192 | 2/1890 | Rhind | 242/107.15 |
| 3,549,203 | 12/1970 | Rawson | 242/107.11 X |
| 3,650,222 | 3/1972 | Broling | 105/368 T X |
| 3,715,994 | 2/1973 | Mieta | 105/368 T |
| 3,751,101 | 8/1973 | Miller et al. | 248/361 A X |

*Primary Examiner*—M. Henson Wood, Jr.
*Assistant Examiner*—Gene A. Church
*Attorney, Agent, or Firm*—Gravely, Lieder & Woodruff

[57] ABSTRACT

A tie-down apparatus for securing a normally movable structure to a supporting structure includes a winch mounted on one of the structures and having a rotatable drum from which elongated tying elements extend in opposite directions. The tying elements are connected to the other structure and then the winch drum is turned to bring the tying elements taut, thus securing the movable structure firmly to the supporting structure. Among other applications, the tie-down device may be used to secure automobiles to transport vehicles or mobile homes to the pads on which they rest.

13 Claims, 7 Drawing Figures

PATENTED OCT 15 1974
3,841,235
SHEET 1 OF 2

WHEELED VEHICLE TIE-DOWN DEVICE

BACKGROUND OF THE INVENTION

This invention relates in general to tie-down devices and more particularly to a tie-down device for securing a normally movable structure to a supporting structure.

Multilevel rail cars consitute the principal conveyance for delivering new automobiles from assembly plants to individual dealerships throughout the country. These rail cars usually have three decks, each of which will accommodate four or five automobiles. Because the rail cars undergo severe jolts in transit, particularly during so-called humping operations in switch yards, merely setting the parking brakes of the automobiles is not enough to hold them in place on the decks. Therefore, tie-down devices are employed to secure the automobiles in place.

The typical tie-down device includes a chain having a hook or other suitable attachment fitting at one end and its other end connected to some type of manually operated tightening apparatus such as a winch. The hook or other attachment fitting engages an apertured tab on the frame of the automobile or merely an aperture in the frame, while the tightening apparatus is secured to a tie-down track extending along the deck of the rail car. Hence, when the chain is tightened the frame of the automobile is drawn downwardly in opposition to the force exerted by the automobile's spring suspension system, and the automobile is held firmly in place on the rail car deck.

Automobile tie-down devices of current manufacture are not entirely satisfactory. In the first place, the chains have little if any resilience, and when the rail car experiences extremely severe shocks, some of the chains will break, or else the portion of the automobile frame engaged by the hook or other attachment fitting will be distorted or torn loose. In addition, four tightening apparatus must be operated to secure each automobile, and this requires an excessive amount of time. Also, since each tie-down device is or has its own tightening apparatus, sometimes substantially different forces are applied to the automobile frames near the four corners thereof. The prolonged application of these unequal forces, particularly during a long rail journey, can result in permanent distortion of the frame. In other words, the application of unequal tie-down forces can warp the automobile frames.

Also, in the mobile home field tie-down devices for securing such homes to their supporting pads are difficult to operate and cannot be released quickly to evacuate the mobile home in the event of fire.

SUMMARY OF THE INVENTION

One of the principal objects of the present invention is to provide a tie-down apparatus for securing a normally movable structure to a supporting structure. Another object is to provide a tie-down apparatus which secures wheeled vehicles to transport vehicles such that the tie-down forces applied at each end of the wheeled vehicles are substantially equal. A further object is to proivde a tie-down system utilizing a single tie-down apparatus at each end of the transported vehicle so that only two tie-down apparatus need be operated to secure a vehicle. An additional object is to provide a tie-down apparatus which is easy to operate, and may be operated in a minimum amount of time. Still another object is to provide a tie-down apparatus which utilizes the inherent resiliency of wire rope to absorb severe shocks encountered in transit. Yet another object is to provide a tie-down apparatus which is suited for securing mobile homes to the pads on which they rest. These and other objects and advantages will become apparent hereinafter.

The present invention is embodied in a tie-down device for securing a normally movable structure to a supporting structure and includes a winch supported on one of the structures and having two ties wound around it and connected to the other structure. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
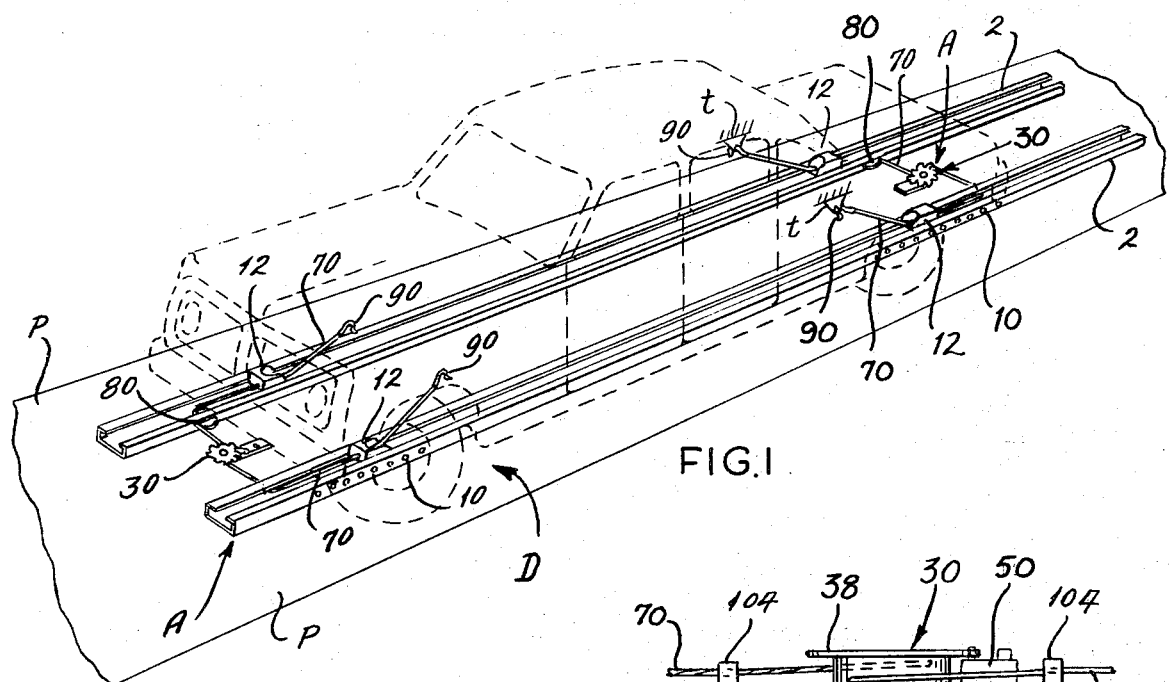
FIG. 1 is a perspective view of a rail car deck having tie-down apparatus constructed in accordance with and embodying the present invention.
Figure 7:
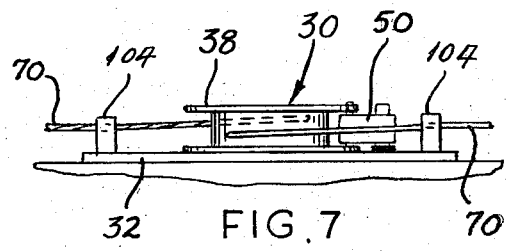
FIG. 7 is an elevational view of the modified tie-down device.

Referring now to the drawings, D designates a deck on a multilevel rail car of the variety used to transport wheeled vehicles, particularly automobiles. The automobiles are driven onto the deck D from the end of the rail car and as they roll along the deck D their tires follow tire paths P along the outside of the deck D. The deck D also carries a tie-down apparatus A for securing the automobiles driven onto it. Thus, the deck D serves as a supporting structure for not only the automobiles, but also for the tie-down apparatus A.

Figure 3:
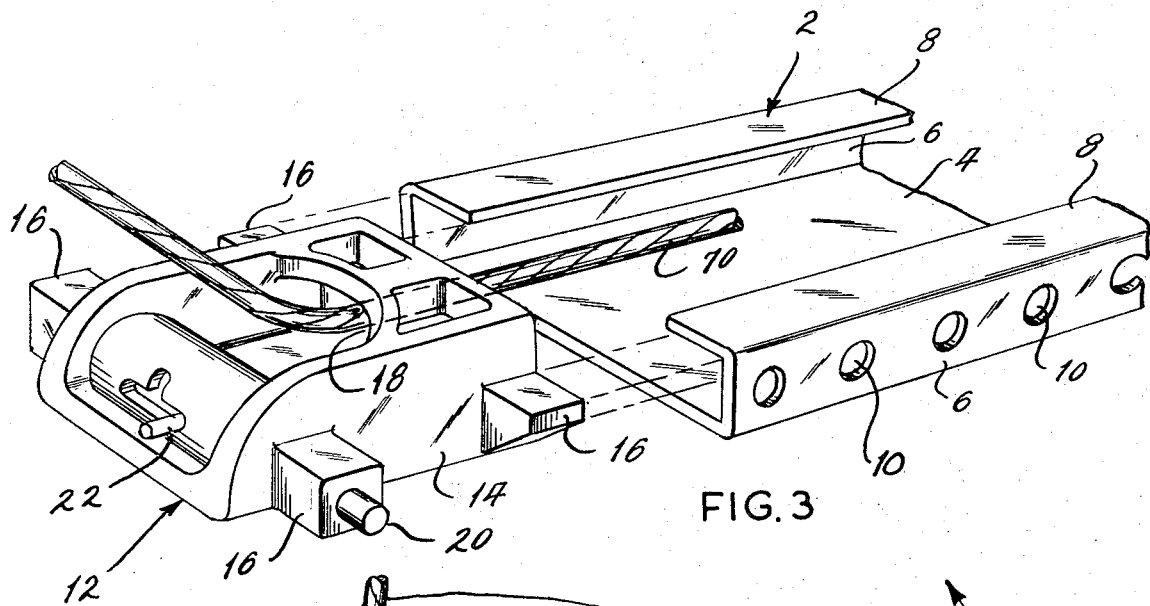
FIG. 3 is a perspective view of a standard idler unit and tie-down track used with the tie-down apparatus.

The tie-down apparatus A includes a pair of tie-down tracks 2 which extend the length of the deck D along the inner sides of the tire paths P. Thus, the spacing between the two tracks 2 is such that the automobiles will straddle them. Each tie-down track 2 is somewhat channel-shaped in cross section and includes (FIG. 3) a base wall 4, a pair of sidewalls 6 projected upwardly from the side edges of the base wall 4 and top flanges 8 extended inwardly from the top edges of the sidewalls 6. The base wall 4 is fastened to the deck D, while the outermost sidewall 6 is provided with uniformly spaced apertures 10 along its entire length.

Fitted into the channels of the tie-down tracks 2 are idler units 12, and these units function as retainers for the ties which extend upwardly from the deck and actually engage the automobiles on it. Each idler unit 12 includes (FIG. 3) a cast iron block 14 which is for the most part narrower than the spacing between the top flanges 8 on the tie-down track 2. The block 14, however, has two retention lugs 16 projecting from each side thereof, and the width of the block 14 at the lugs 16 is greater than the space between the top flanges 8, yet is less than the spacing between the sidewalls 6. Thus, the lugs 16 project underneath the top flanges 8 and prevent the idler units 12 from being withdrawn from the tie-down tracks 2. The block 14 of the idler unit 12 is further cast with an eye 18 in it, and this eye is exposed between the two top flanges 8 of the track 2 so that an elongated tying device such as a chain or wire rope may be inserted through and retained by the idler unit 12. The block 14 is fitted with a spring loaded lock pin 20 which normally extends outwardly through one of the retention lugs 16. The pin 20 is sized and positioned to fit in the apertures 10 of the tie-down track 2, and when engaged with one of the apertures 10, it will prevent the idler unit 12 from sliding along the track 2. The lock pin 20 is fitted with a handle 22 so that it may be withdrawn from an aperture 10 in the track 2, and when withdrawn the idler unit 12 may be moved along the track 2 to another position. Moreover, the handle 22 may be blocked to hold the lock pin 20 in its retracted position, and this facilitates positioning the idler unit 12.

The deck D, the tie-down tracks 2, and the idler units 12, heretofore described are conventional with multi-level rail cars and tie-down apparatus of current construction.

Aside from the foregoing conventional components, the tie-down apparatus A further includes wafer-type winches 30 which are fastened to the deck D between the two tie-down tracks 2. The positioning of the winches 30 is such that they will be located generally under the front and rear bumpers of the automobiles. The winches have extemely low profiles so as not to interfere with under car components as automobiles are driven along the deck D.

Each wafer-type winch 30 includes (FIGS. 4 and 5) a base or mounting plate 32 which rests on the deck D and pivots at one end about a bolt or other pintle 34 projecting upwardly from the deck D. At its opposite end the plate 32 is provided with a spindle 36 which projects upwardly therefrom, and this spindle serves as a journal for a winch drum 38 which rotates on the plate 32. The spindle 36 has a head to retain the drum 38 on it.

The drum 38 consists of (FIGS. 4 and 5) a pair of circular end plates 40 and a circular hub 42 interposed between and separating the end plates 40. The hub 42 is provided with retention slots 44, and at those slots the end plates 40 have circular openings 46 which expose the ends of the slots 44 as well as the adjacent edge portions of the hub 42. Opening out of the periphery of the circular end plates 40 at equally spaced intervals are oblique grooves 48 which form ratchet teeth in the periphery of the drum 38.

The winch 30 also includes a pawl 50 which pivots about a pin 52 fastened to the mounting plate 32, and this pawl projects into the space between the two plates 40 in the drum 38 (FIG. 5) where it is provided with a stop pin 54 which fits into the oblique grooves 48 of the end plates 40. The pawl 50 is urged toward the drum by a spiral spring 56. Thus, the pawl 50 allows the drum 38 to rotate in only one direction.

The drum 38 is turned manually with the aid of a detachable operating bar 60 having a slot 62 at one end. The slot 62 extends longitudinally of the bar 60 and is sized to receive the head on the spindle 36 about which the drum 38 rotates so that the bar 60 may be brought against the upper of the two end plates 40 on the drum 38. Beyond the slot 62 the bar 60 is further provided with stud 64 which is sized to fit into the oblique grooves 48 on the upper end plate 40 of the drum 38. The spacing between the slot 62 and the stud 64 is such that the stud 64 will fit into one of the grooves 48 when the head of the spindle 36 is at one end of the slot 62 and the stud 64 will be located beyond the periphery of the drum 38 when the head of the spindle 36 is at the other end of the slot 62. The operating bar 60, of course, is used to apply torque to the drum 38, but this is possible only when the stud 64 thereon is engaged with one of the oblique grooves 48. The bar 60 may be moved back along the drum 38 to a convenient starting position when the stud 64 is beyond the periphery of the drum 38, and is provided with a handle 66 to facilitate turning it.

Wound around the circular hub 42 on the drum 38 are two wire ropes 70, and these ropes further lead away from the drum 38 with one extending toward the one tie-down track 2 and the other extending toward the other tie-down track 2. The two ropes 70 are wound around the drum in the same direction and leave the drum 38 at 180° intervals along its periphery.

The inner ends of the wire ropes 70, that is the ends at the winch 30, have suitable fittings 72 swaged on them, and these fittings fit into the interior of the hub 42 to secure the ropes 70 to the drum 38. To install one of the ropes 70, the end thereof having the fitting 72 on it is inserted between the two end plates 40 and advanced toward the center hub 42. The fitting 72 at the end of the rope 70 is then withdrawn from one of the circular openings 46 in the uppermost end plate 40, passed over the exposed edge of the hub 42, and then inserted back into the opening 46. At the same time the section of rope 70 immediately ahead of the fittings 72 is fitted into the slot 44 in the hub 42. This places the fitting 72 into the interior of the hub 42, and leaves the rope 70 extended outwardly therefrom. The other rope 70 is installed through the other circular opening 46 and retention slot 44 in an identical manner and leaves the drum 180° from the first rope 70.

As previously noted, the two ropes 70 which are wound upon each winch 30 extend in opposite directions toward the two tie-down tracks 2 where they pass over sheaves 80 (FIGS. 1 and 2) located along the inner edges of the tie-down tracks 2. Indeed, the inner sidewalls 6 of the tie-down tracks 2 are cut away to accommodate the sheaves 80. The sheaves 80 rotate about vertical axes located adjacent to the tie-down tracks 2.

Beyond its sheaves 80, each wire rope 70 extends through the channel-like interior of the tie-down track 2 to the closest idler unit 12, where it passes through the eye 18 therein and extends upwardly toward the frame of an automobile above it. The outer end of the wire rope 70 is fitted with a hook or other attachment fitting 90 for attaching that end to an apertured tie-down tab $t$ on the automobile frame or merely to an aperture in the frame (FIG. 1).

OPERATION

Figure 2:
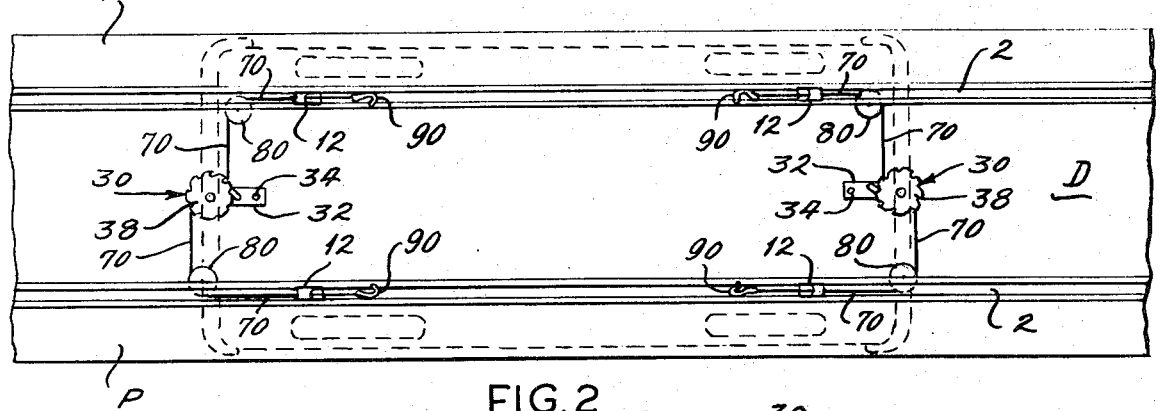
FIG. 2 is a plan view showing that much of the tie-down apparatus necessary to hold one automobile.
Figure 6:
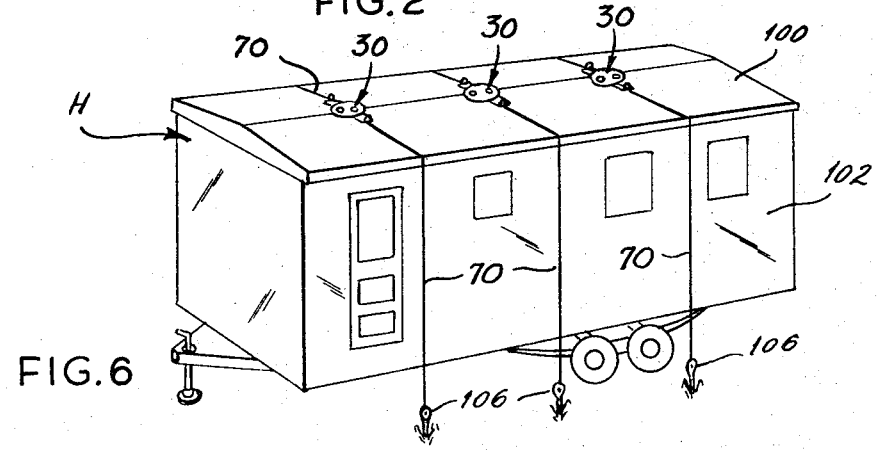
FIG. 6 is a perspective view of a modified tie-down device used to secure a mobile home to its supporting pad.

In loading the multilevel rail car, automobiles are driven onto the deck D and positioned thereon with their bumpers generally above the winches 30 of the tie-down apparatus A (FIG. 1). The wheels of the automobiles will be to the outside of the tie-down tracks 2 which will generally underlie the longitudinal members of the automobile frames. Once an automobile arrives at the correct position, the ignition switch is turned off, the transmission is placed in neutral, and the hand brake is set. Thereafter the attachment fittings 90 at the ends of the wire ropes 20 are engaged with the tie-down tabs *t* on the automobile frame or with apertures in the frames themselves.

After the ends of the wire ropes 70 are secured to the automobile, the idler units 12 are moved along the tie-down tracks until the portions of wire ropes 70 extending between them and the automobile frame assume an angle of between about 35° and 45° with respect to the tie-down track. Moreover, the upwardly extending portions on ropes 20 leading from the same winch 30 must be at the same angle, and therefore corresponding idler units 12 in the different tracks 2 must be directly opposite from one another. Each idler unit 12, is, of course, positioned by pressing against its handle 22 to retract the lock pin 20 thereof and then sliding the idler unit 12 along the track 2 until the desired position is attained, at which time the handle 22 is released and the lock pin 20 will move outwardly. The idler unit 12 is thereupon moved in either direction until the lock pin 20 snaps into the nearest track aperture 10. The idler unit 12 will no longer move.

Figure 4:
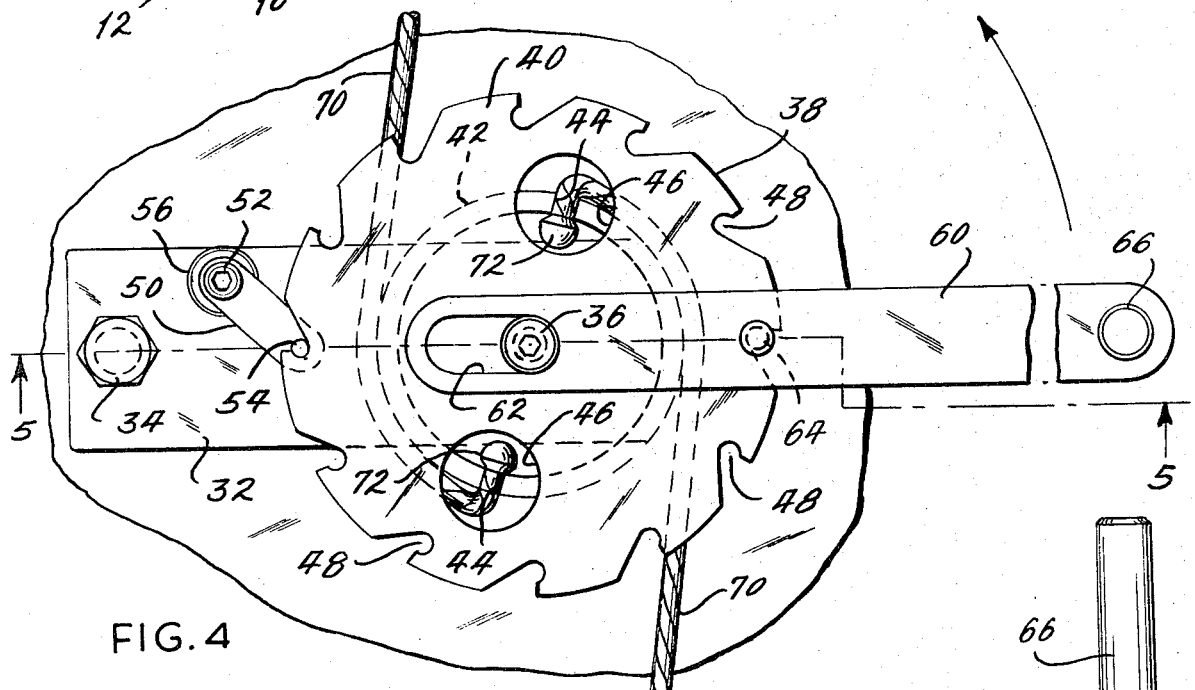
FIG. 4 is a plan view of a winch forming part of the tie-down apparatus.
Figure 5:
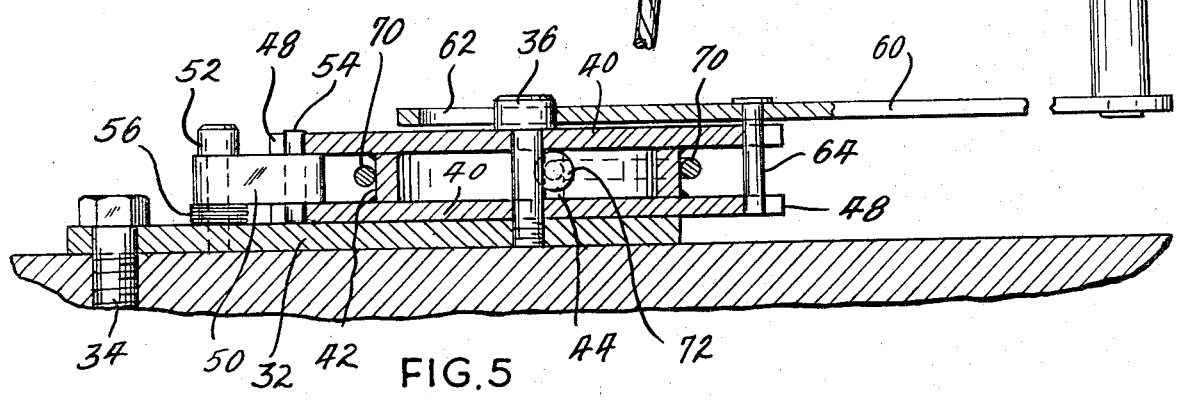
FIG. 5 is a sectional view taken along lines 4—4 of FIG. 4.

Once the idler units 12 are correctly located, the operating bar 60 is placed over the uppermost end plate 40 of the winch drum 38 with the head of the drum spindle 36 being received in the slot 62 of the handle 22 and the stud 64 on the bar 60 being engaged with one of the oblique grooves 48 of the drum 38 (FIGS. 4 and 5). The drum 38 is turned with the bar 60 and this draws both ropes 70 inwardly and winds them about the hub 42 of the drum 38. As the ropes 70 tighten, the automobile frame is drawn downwardly against the force exerted by the springs of the suspension system. The pawl 50 prevents the drum 38 from rotating in the opposite direction once the torque applied through the bar 60 is released. As soon as one winch 30 is set, the bar 60 is removed therefrom and used to turn the drum 38 of the winch 30 at the opposite end of the automobile. Tightening the two winches 30 secures the automobile firmly in place so that it will not move on the deck D, even when the rail car experiences severe impacts.

By reason of the fact that each winch 30 pivots about a pintle 34, the tension in the two ropes 70 leading from that winch 30 is equal and consequently equal forces are applied to each side of the automobile. This prevents the automobile frame from being twisted and perhaps taking on a permanent set in the twisted condition. Thus, the plate 32 and the pintle 34, offset from the spindle 36, serve as means for equalizing the forces in the two ropes 70 leading from the winch 30. Moreover, only two tightening operations are needed to secure each automobile instead of four as is true of conventional tie-down apparatus. Also, the front tie-down winch 30 for one automobile is located close by the rear tie-down winch 30 of the next automobile so that the workman can in effect operate two inches 30 from the same location. This saves considerable time. Finally, it should be noted that wire rope 70 has a limited amount of resilence, and this resilience enables the ropes 70 to absorb shocks which might otherwise be damaging to the automobile frame.

To release the automobile from the tie-down device A, a workman merely strikes the outwardly projecting portions of the lock pins 20 with a hammer, thereby driving the pins 20 into their respective cast iron blocks 14. This enables the idler units 12 to move longitudinally along their tie-down tracks 2 and thereby relax the tension in the wire ropes 70 which pass through them. The workman then removes the attachment fittings 90 from the apertured tie-down tabs *t* or from the frame of the sutomobile and lets them drop to the deck D. The automobile is then free to be driven off of the deck D.

The tie-down winches 30 may be assembled with their components in the reverse position. For example, the mounting plate 32 may be turned upside down so that the drum 38 and the pawl 50 are on the opposite side. This enables the winches 30 to be mounted on the deck D such that all tighten when turned in the same direction.

The tie-down apparatus A may be utilized with other types of transport vehicles for automobiles and other wheeled vehicles. For example, it may be used on over-the-road tractor-trailer rigs used to transport automobiles.

The tie-down apparatus A may be used for purposes other than securing automobiles to transport vehicles. Regulations governing the operation of mobile home parks require that mobile homes be secured to the pads on which they rest so they will not be toppled by high winds. The securement, however, should be such that it can easily be detached so that the mobile home can be quickly evacuated in the event of fire. A modified version of the tie-down apparatus A is ideally suited for this purpose.

The tie-down apparatus A is modified slightly for use with a mobile home H having a roof 100 and sidewalls 102. In particular, the mounting plate 32 is extended beyond the periphery of the winch 30 in both directions and near its ends it is provided with guide eyes 104 through which the wire ropes 70 extend.

The tie-down apparatus A rests on the roof 100 of the mobile home H with its mounting plate 32 extended generally transversely of the roof 100. The two wire ropes 70 likewise extend transversely over the roof 100 and thence downwardly along the sidewalls 102. The hooks or attachment fittings 90 at the lower ends of the wire ropes 70 attach to anchors 106 secured in the ground.

When the winch 30 is turned it draws the wire ropes 70 taut and this secures the mobile home H securely to the ground. The mobile home H will accordingly withstand high winds without toppling. In the event of a fire the ropes can easily be slackened and the mobile home evacuated. Indeed, if the mobile home is not blocked but instead is supported only on its springs, the body of it need only be rocked to slacken the ropes 70 enough to disengage the hooks or fittings 90 from the anchors 106.

This invention is intended to cover all changes and modifications of the example of the invention herein chosen for purposes of the disclosure which do not con-

What is claimed is:

1. A tie-down apparatus for securing a wheeled vehicle to a supporting structure in a fixed position on the supporting structure, said apparatus comprising: a winch supported on the supporting structure and having a rotatable drum; idler units fastened to the supporting structure near the sides of the wheeled vehicle, two elongated tying elements wound around the winch drum in the same direction so that when the winch drum is turned both tying elements will either wind further around the drum or pay out from the drum, depending on the direction of rotation of the drum, one of the tying elements being engaged with the idler unit at one side of the wheeled vehicle and extending upwardly therefrom to the wheeled vehicle to which it connects, the other tying element being engaged with the idler unit at the opposite side of the wheeled vehicle and extended upwardly therefrom to the wheeled vehicle to which it connects, and means for equalizing the forces applied to the tying elements, whereby when the winch drum is turned such that the tying elements wind around it, the wheeled vehicle is secured firmly to the supporting structure with substantially equal tie-down forces applied thereto by the tying elements.

2. A tie-down apparatus according to claim 1 wherein the tying elements are wire ropes.

3. A tie-down apparatus according to claim 1 wherein the means for equalizing forces applied to the tying elements includes a base on which the drum rotates, and the base pivots relative to the supporting structure at a location offset from the axis of rotation for the drum on the base so that the tension in each of the tying elements equalizes.

4. A tie-down apparatus according to claim 1 wherein the means for equalizing the forces in the tying elements is part of the winch and includes a base which pivots about a vertical axis fixed with respect to the supporting structure and the drum which is carried by the base and rotates about a vertical axis which is fixed with respect to the base and is offset from the axis about which the base pivots so that the tension in each of the tying elements will equalize.

5. A tie-down apparatus according to claim 4 wherein parallel tie-down tracks are mounted on the supporting structure with the spacing between the tracks being such that the wheeled vehicle will straddle both tracks; and wherein the idler units are shiftable along the tracks and can be locked in selected positions on the tracks.

6. A tie-down apparatus according to claim 5 wherein the winch is located between the tracks; and wherein guide means are located adjacent to the tracks, the tying elements passing around the guide means and thence along the tracks to the idler units where they turn upwardly.

7. A tie-down apparatus according to claim 2 wherein each wire rope at the end thereof located on the winch drum has an enlargement thereon; and wherein the winch drum comprises: a pair of generally circular end plates, and a hub separating the end plates, the hub having at least one slot sized to accommodate the wire rope but not the enlargement, at least one of the end plates having an opening which exposes the edge of the hub and the end of the slot therein and is large enough to enable the enlargement to be withdrawn from the space between the two plates and reinserted into the interior of the hub so that the wire rope will extend through the slot but will be retained therein by the enlargement.

8. A tie-down device according to claim 6 wherein the guide means are sheaves which rotate about vertical axes.

9. In a vehicle transporter having a deck onto which wheeled vehicles are driven, a pair of tie-down tracks extended along and secured to the deck with the spacing between the tracks being such that the wheeled vehicles straddle both tracks, and idler units movable along the tracks and capable of being locked to the tracks at selected positions along the tracks; the improvement comprising: a winch positioned on the deck between the tracks thereon and having a rotatable drum, two wire ropes wound around the drum in the same direction so that when the rotatable drum is turned, both ropes will either wind further around the drum or pay out from the drum, depending on the direction of rotation, the ropes being extended from the drum to the idler units with the one rope extending through the idler unit on one track and the other rope extending through the idler unit on the other track, the ropes thereafter extending upwardly and being connected to the wheeled vehicle so that the wheeled vehicle will be secured to the deck, and means for equalizing the forces applied to the wire ropes so that equal tie-down forces may be applied to both sides of the vehicle.

10. The structure according to claim 9 wherein the means for equalizing the forces in the wire ropes is part of the winch and includes a base which supports the winch drum and pivots about a vertical axis fixed in position with respect to the deck, the vertical axis being offset from the axis of rotation for the drum, whereby when the wire ropes are wound around the drums the tnesion in the wire ropes will equalize.

11. A tie-down apparatus for securing normally movable structure to a supporting structure in a fixed position on the supporting structure without varying the position of the supported structure on the supporting structure, said tie-down apparatus comprising: a winch supported on one of the structures and having a rotatable drum and locking means for securing the drum in selected angular positions, the locking means being releasable to permit the drum to turn; two elongated tying elements wound around the winch drum and extended therefrom in opposite directions, the tying elements being wound around the drum in the same direction so that when the drum is turned, both tying elements will either wind further around or pay out from the drum, depending on the direction of rotation, the ends of the elongated tying elements being connected to the other structure so that when the winch drum is turned such that the tying elements become taut the normally movable structure is secured firmly to the supporting structure, and means for equalizing the forces in the tying elements.

12. A tie-down device according to claim 11 wherein the elongated tying elements change direction intermediate the winch drum and said other surface.

13. A tie-down device according to claim 12 wherein the means for equalizing the forces in the tying elements includes a mounting plate on which the winch drum rotates and a pivot about which the mounting plate rotates, the pivot being secured to the structure on which the winch is mounted with its pivot axis offset from the axis of the drum, but parallel thereto; and wherein guides are mounted on the mounting plate.

* * * * *